Figure 1:
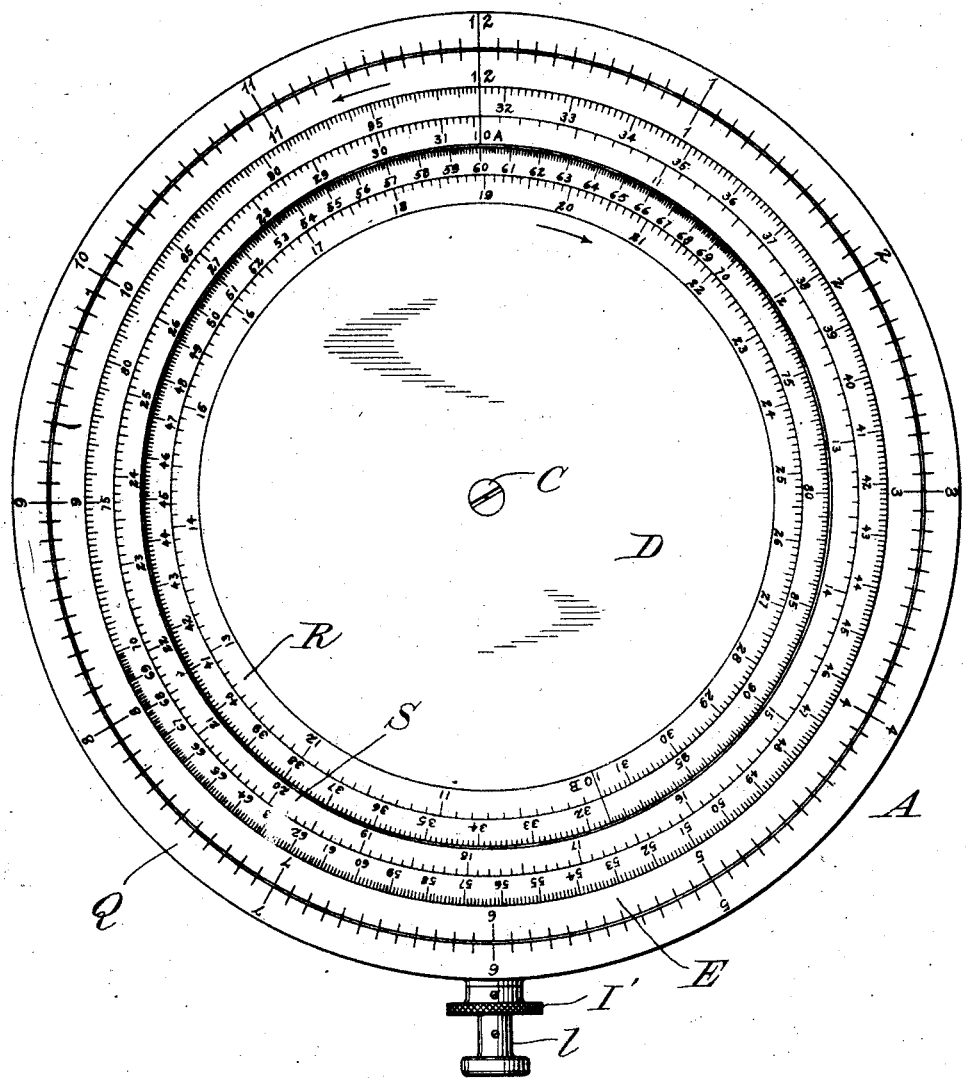

C. A. BISHOP.
CALCULATING INSTRUMENT.
APPLICATION FILED NOV. 13, 1908.

1,039,245.

Patented Sept. 24, 1912.
4 SHEETS—SHEET 1.

WITNESSES

INVENTOR
Clarence A. Bishop
BY
ATTORNEYS

C. A. BISHOP.
CALCULATING INSTRUMENT.
APPLICATION FILED NOV. 13, 1908.

1,039,245.

Patented Sept. 24, 1912.
4 SHEETS—SHEET 2.

WITNESSES

INVENTOR
Clarence A. Bishop
BY Griffins Bernhard
ATTORNEYS

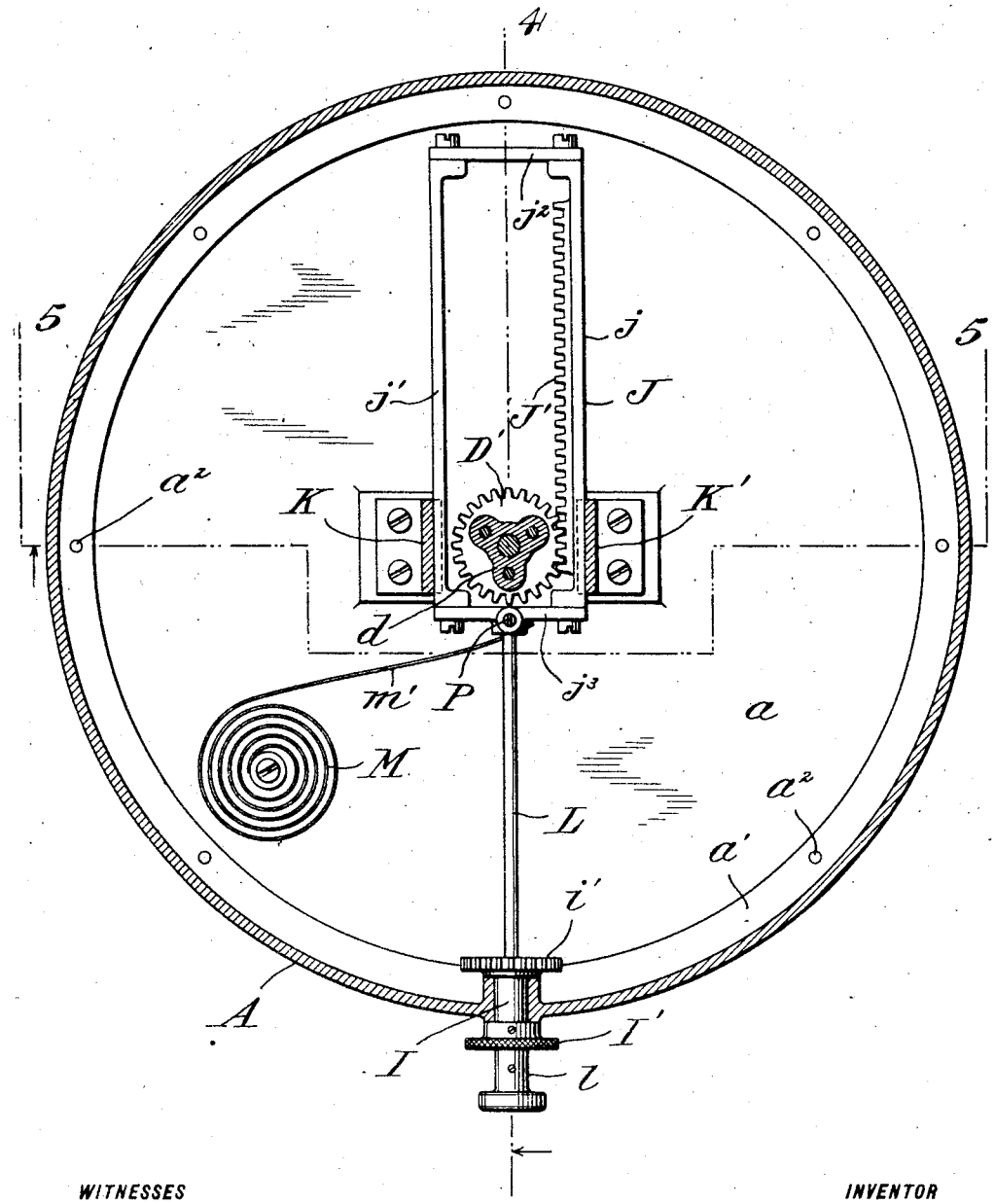

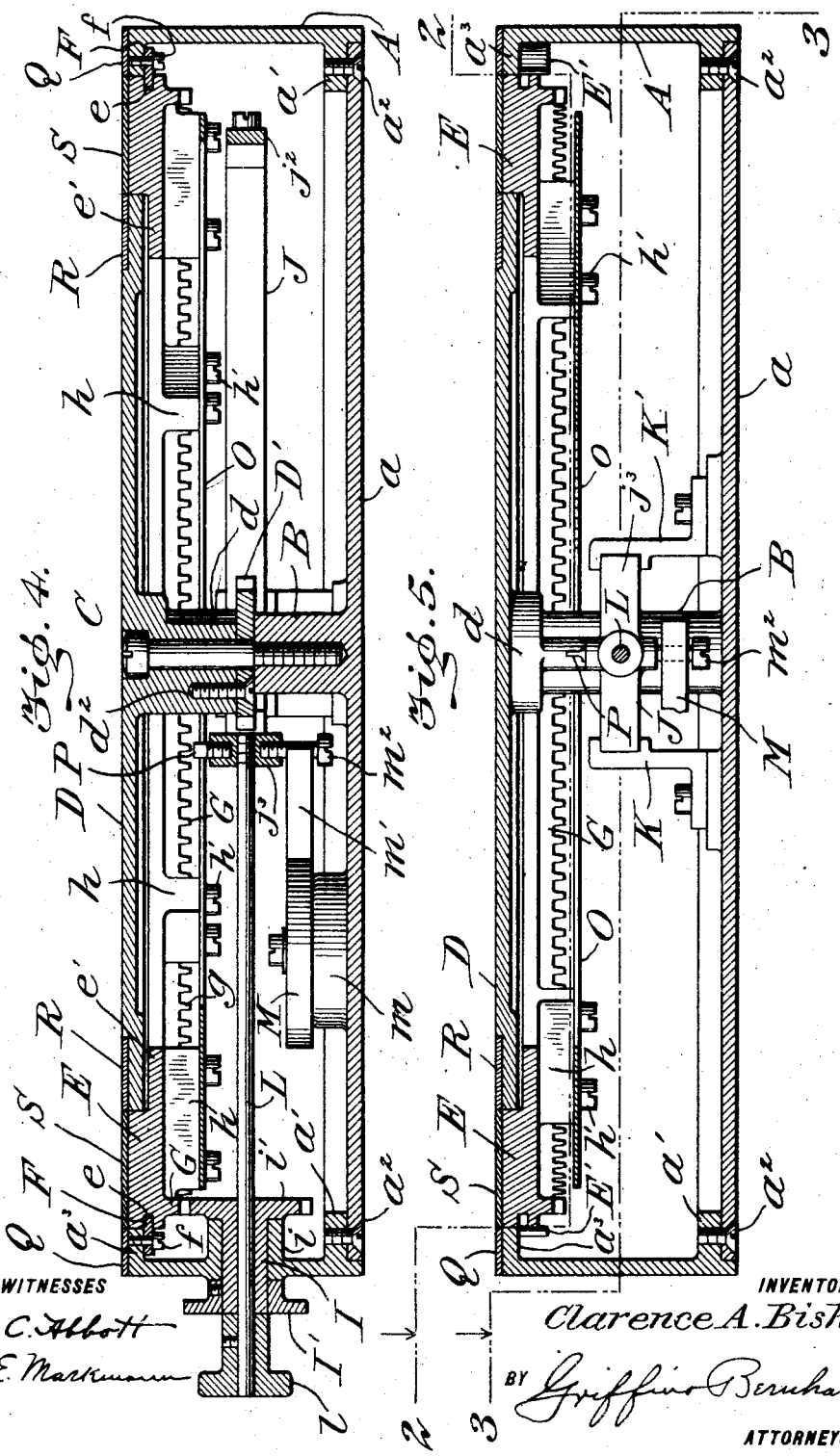

UNITED STATES PATENT OFFICE.

CLARENCE A. BISHOP, OF NEW YORK, N. Y.

CALCULATING INSTRUMENT.

1,039,245.   Specification of Letters Patent.   Patented Sept. 24, 1912.

Application filed November 13, 1908. Serial No. 462,376.

*To all whom it may concern:*

Be it known that I, CLARENCE A. BISHOP, a citizen of the United States, residing in the city of New York, borough of Brooklyn, county of Kings, and State of New York, have invented a certain new and useful Calculating Instrument, of which the following is a specification.

This invention is a calculating instrument which is particularly adapted, among other purposes, to calculate the total amount of wages to which a person is entitled for working a given time at a fixed or specified rate. The instrument, in its entirety, may be employed to determine the elapsed time, in hours and fractions thereof, or the amount of time between the hour and minute when a person begins work and the hour and minute when he stops work, and, also, to calculate the wages to which such person is entitled for such elapsed time, at a given rate per hour. The time having been determined, the calculation of the wages is effected by means of a logarithmic scale or scales, thereby greatly facilitating the work.

In one aspect, the invention embodies a plurality of movable members and a stationary member, said movable members being, preferably, rotatable, and all of said members being preferably concentric. The stationary member may be a part of, or attached to, a casing for appropriate operating mechanism, and said stationary member, together with an adjacent movable (rotary) member, being provided with scales or dials whereby the elapsed time may be determined. Said movable (rotary) members are provided with logarithmic scales, one of which logarithmic scale represents the rate, and the other being so related to the time indicating and rate indicating scales as to indicate the resultant calculation in wages for variable periods of time computed at variable rates per hour, or fractions thereof.

In a preferred form of the invention, the movable, and preferably rotary, members are separately actuated by conveniently located operating devices, and in order to secure ease and facility of operation, without confusion to the operator, it is preferred to so construct these operating devices that one of them is actuated by a rotary motion, whereas another of them is movable with a sliding motion.

The invention embodies, furthermore, a variable stop mechanism, comprising in a preferred form a rotary serrated or toothed member and a sliding dog, the latter being movable to variable positions depending upon the engagement of said dog with one of a large number of teeth or serrations on the aforesaid rotary member. The dog is carried by a sliding part of one of said operating devices, whereas the serrated or toothed member is secured firmly to one of the two aforesaid rotary members of the instrument.

In the accompanying drawings I have illustrated one practical embodiment of the invention, but the construction shown therein is to be understood as illustrative, only, and not as defining the limits of the invention.

Figure 2:
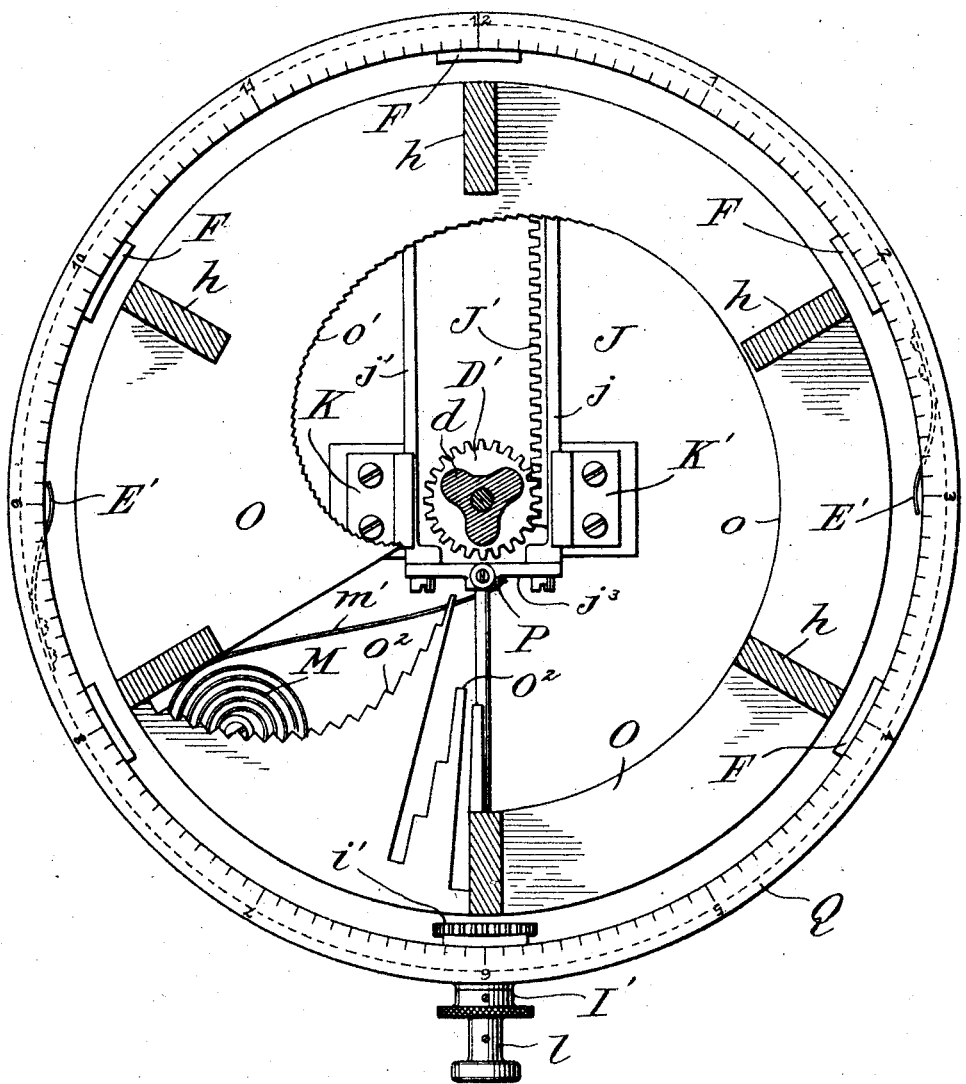

Figure 1 is a plan view of a calculating instrument constructed in accordance with my invention and illustrating the several dials or scales in a position ready to begin the operations of determining the time and calculating the resulting amount. Fig. 2 is a horizontal section on the line 2—2 of Fig. 5 looking in the direction of the arrow and showing, more particularly, the variable stop mechanism whereby the rotation of one member carrying a logarithmic scale may be arrested at a point determined by the adjustment of another member, which latter member is equipped with one part of the time indicating mechanism and another logarithmic scale. Fig. 3 is another horizontal section on the line 3—3 of Fig. 5 showing, more particularly, the slidable operating mechanism for imparting rotary motion to the inner rotary member which is provided with a logarithmic scale indicating the rate. Fig. 4 is a vertical section through the instrument on the line 4—4 of Fig. 3 looking in the direction of the arrow, and Fig. 5 is a section at right angles to Fig. 4 and on the plane indicated by the irregular dotted line 5—5 of Fig. 3 looking in the direction of the arrow.

The several working parts of the instrument are housed or incased substantially within a casing, A, shown in the drawings as circular in shape and provided with a removable base plate, $a$, the latter being secured to a flange, $a'$, by screws, $a^2$, see Figs. 4 and 5. Projecting upwardly from base plate, $a$, is a post, B, preferably integral with said base, and this post supports a spindle, C, shown in Fig. 3 as a screw which is tapped into said post.

D, E, designate movable members of the instrument, said members being preferably mounted for rotation in the upper part of casing, A, and disposed in concentric relation to each other. Member, D, is provided with a depending boss, $d$, which is formed with a central opening adapted to loosely receive fixed spindle, C, whereby rotary member, D, is loosely mounted on said fixed spindle for rotation freely with respect thereto. The depending boss, $d$, may have any appropriate shape in cross section, although in Fig. 2 said boss is represented as being substantially triangular, and to the lower part of said boss there is rigidly secured a gear or pinion, D', the latter being applied to the lower face of the boss, $d$, and secured firmly in position by screws, $d^2$. Said gear turns with boss, $d$, and member, D, and it is adapted for engagement with the upper extremity of post, B, whereby member, D, is supported in the upper part of casing, A, so that the upper face of said member, D, is exposed to view, as will be apparent from an inspection of Figs. 1, 4 and 5 of the drawings.

Member, E, is shown in the form of a ring adapted to fit between flange, $a^3$, at the upper part of casing, A, and the edge of member, D, see Figs. 4 and 5. Said member, E, is supported in casing, A, for rotation freely therein and so as to be flush substantially with member, D, it being preferred to position rotary members, D, E, in substantially the same horizontal plane. Member, E, is provided in its outer edge with an annular groove or recess, $e$, in which is fitted a supporting ring or plate, F, or sections of said ring or plate, as shown in Fig. 2. Said ring or plate is fitted against the lower face of over-hanging flange, $a^3$, and it is secured thereto by screws, $f$, whereby ring, F, or the sections of said ring, are fixed to casing, A, and extend loosely in recess, $e$, of member, E, for the purpose of supporting said member rotatably in position. Member, E, is, furthermore, provided with an inwardly extending flange, $e'$, adapted to fit below the edge portion of member, D, and, furthermore, member, E, is provided with a depending rim, G, having teeth, $g$, thereby producing a gear of large diameter on the underface of said member, E. Furthermore, member, E, is provided with a plurality of substantially radial lugs, $h$, shown in Figs. 2, 4 and 5, said lugs being adapted to support the serrated or toothed plate forming one element of a variable stop mechanism to be hereinafter described.

Rotatable member, E, is restrained from idle or lost motion by an appropriate form of brake mechanism herein shown as springs, E', secured to overhanging flange, $a^3$, and positioned for engagement frictionally with the periphery of said member, E. Said springs restrain the rotary member, E, from rotation too freely, and they operate to arrest the movement of said member quickly when the rotary operating member is stopped, but it will be understood that any other form of frictional brake mechanism may be substituted for the springs which are shown in Fig. 2.

One operating device is associated with toothed rim or gear, G, of member, E, for the purpose of rotating the latter, and, as shown in Figs. 3 and 4, said rotary operating member comprises a sleeve, I, which is supported in a boss, $i$, at one side of casing, A. The inner end of said operating sleeve, I, is provided with a gear, $i'$, adapted to mesh directly with toothed rim or gear, G, of member, E. Sleeve, I, extends outside of the casing and it is provided with an external thumb wheel or knob, I', the latter being made separate from the sleeve and clamped or otherwise secured rigidly thereto.

Sleeve, I, constitutes a rotary operating means engaging directly with a part of one rotating member, E, for the purpose of turning the latter within casing, A, and relative to a scale on said casing and to a scale or scales on member, D. Another operating mechanism adapted for sliding movement is provided as a part of the instrument and it has coöperative relationship to gear, D', of member, D, whereby a sliding movement of said operating means imparts rotary movement to member, D. Said sliding operating mechanism embodies a frame, J, shown in Figs. 2, 3, 4 and 5 of the drawings as consisting of side bars, $j, j'$, end bars, $j^2$, and a cross head, $j^3$, the end bars, $j^2$, and the cross head, $j^3$, being secured rigidly to the respective end portions of side bars, $j, j'$. One of the side bars of said sliding frame is provided with a rack, J', which meshes directly with gear, D', the latter being secured rigidly to depending boss, $d$, of rotary member, D, as heretofore described. Sliding frame, J, is supported for movement within casing, A, by any suitable means, it being preferred to position said frame, J, below members, D, E. As shown, guides, K, K', are fixed to base, $a$, at the respective sides of post, B, and said guides are engaged with bars, $j, j'$, of sliding frame, J, whereby said frame is supported firmly in position within casing, A, and it is adapted for reciprocating movement therein.

To the cross head, $j^3$, of sliding frame, J, is attached an operating stem, L, the latter passing loosely through rotary sleeve, I, and provided at its outer end with an operating knob, $l$, the latter being exposed for access outside of thumb wheel, I', whereby the parts, l, I', are positioned exteriorly to casing, A, and they are adapted for convenient access by the operator. Stem, L, is adapted to be drawn outward by hand in order to impart sliding movement to frame, J, and rack, J', said rack acting on gear, D', for rotating member, D, with respect to member, E. Rack, J', and stem, L, are retained normally in the position shown in the drawings by the action of a spring, M, the latter being supported within casing, A, and shown as resting on a plate, m, extending upwardly from base plate, a, see Fig. 4. One end portion, m', of said spring extends below cross head, $j^3$, and is attached thereto by any suitable means, such as the screw, $m^2$, whereby spring, M, is normally connected with sliding frame, J, for the purpose of impelling the latter inwardly with respect to casing, A, and substantially to the position shown in Fig. 3.

The variable stop mechanism hereinbefore referred to comprises a plate, O, and a dog, P. Said plate, O, is fitted against the lugs, h, of member, E, so as to occupy a position below, and parallel to, members, D, E. Plate, O, is secured rigidly to lugs, h, by screws, h', or other devices whereby said plate, O, is adapted for rotation with member, E. The inner edge of plate, O, is peculiarly constructed for coöperation with dog, P, and, as shown, said plate is provided with a substantially spiral inner edge, o, having fine teeth or serrations, o', and coarse teeth, $o^2$. The coarse or large teeth, $o^2$, are variously positioned or disposed on the inner edge, o, of plate, O, and, as shown, a comparatively wide space or opening may intervene certain coarse teeth, $o^2$, and the fine teeth or serrations, o'.

Dog, P, of the variable stop mechanism is shown in Figs. 4 and 5 as consisting of a pointed screw secured rigidly to cross head, $j^3$, of sliding frame, J. Said dog is thus adapted for reciprocating movement within casing A, and it is in the horizontal plane of plate, O, so as to have engagement with any one of the series of coarse or fine teeth on the inner edge of said rotary plate, O. Casing, A, is provided with a dial plate, Q, which is secured firmly to overhanging flange, $a^3$, and, as shown, in Figs. 1 and 2, said dial plate, Q, is provided with graduations similar to the divisions of time on a clock dial, whereby the hours and fractions thereof are indicated.

Rotary member, D, is provided with a dial plate, R, the latter being secured firmly to said member, D, at the edge portion thereof. Said dial plate, R, is provided with divisions and numerals disposed in two circular rows and representing a logarithmic scale embodying the rate.

Rotary member, E, is provided with a dial plate, S, which is secured firmly to the upper side of said ring and is substantially flush with plates, Q and R, on casing, A, and member, D, respectively. Said dial plate, S, is provided with a scale indicating the divisions of time corresponding to the scale on dial plate, Q, and, furthermore, said dial plate, S, is provided with divisions and numerals in concentric circles which form another logarithmic scale independent of the scale on dial plate, R, and adapted to indicate the calculations which are computed by multiplying the time by the rate.

Before explaining in detail the precise mode of operation, it is desired to refer, briefly, to the scales on dials, Q, R, S. The scale on the stationary dial, Q, is graduated similarly to a clock dial, so as to represent the twelve hours of a day, and fractions of the hour; such fractions corresponding to five minutes of time, for the reason, mainly, that in calculating the wages of workmen in a factory no allowance is made for time under five minutes. Dial, R, on movable member, D, is calibrated with a logarithmic scale, and for compactness, the scale consists of two circular rows of graduations and numbers; the numbers in the inner circle running from 1 to 31+ whereas the numbers in the outer circle run from 32— to 99. The scale of dial, S, is another logarithmic scale for reading the resultant amount of calculation in connection with the scale of dial, R; and for compactness, said scale of dial, S, consists of two circular rows of divisions and numbers. In addition to the logarithmic scale, dial, S, is provided with a clock dial similar to the scale on dial, Q.

At the beginning of the operation, members, D, E, occupy, or may assume, the positions shown in Fig. 1, wherein the number 12 of clock dial and number $10^A$ of logarithmic scale on revoluble dial, S, are in alinement or register with number 12 on clock dial, Q, whereas the number 60 of logarithmic scale on dial, R, is in register with $10^A$ of scale on dial, S. As an example of the calculation, we will assume that a workman is engaged in labor on a particular piece of work from 9.15 a. m. to 4.35 p. m., and that his wages are 18 cents per hour. The first operation is to ascertain the elapsed time, that is, the interval between the period when the work is started, 9.15 a. m. and the period when work is stopped, 4.35 p. m. The operator turns knob, I', and rotates member, E, in the direction of arrow in Fig. 1, so that the time dial (the outer circle of member, E) is rotated, the indication thereof denoting 4.35 being brought opposite to the indication 9.15 on stationary time dial, Q, whereupon the indication on time dial of scale, S, on member, E, which indication is brought opposite the number 12 on dial, Q, will show the number 7.20, the latter being the elapsed time of seven hours and twenty minutes. The next step in the order of operation is to calculate the amount which the workman is entitled to receive for the labor of seven hours and twenty minutes at the rate of 18 cents per hour. The operator pulls on the knob, $l$, so as to draw stem, L, outwardly, and this movement of the stem operates frame, J, so that rack, J', will turn gear, D', member, D, and dial, R, and at the same time the stop dog, P, will be drawn outwardly with frame, J, until the stop dog engages with a tooth or serration, $o'$, or $o^2$, of stop plate, O, the latter having been turned with member, E, and dial, S. Now, when the dog, P, engages a tooth of stop plate, O, the outward movement of stem, L, and frame, J, and the rotation of member, D, with scale, R, are arrested. As the rate per hour, 18 cents, appears in the lower circle of logarithmic scale, R, the member, D, will be turned until the indication .18 of scale, R, is opposite to the indication 13.2 in the lower circle of the logarithmic scale on dial, S, the rotation of member, D, and scale, R, being arrested automatically at this point by the dog, P, engaging with serrated plate, O. When member, D, and scale, R, are rotated and stopped, as described, the operator can read the calculation ($1.32) by noting in the lower circle of the logarithmic scale on dial, S, the figure opposite to the rate, 18, in the lower circle of logarithmic scale, R, on member, D.

From the foregoing it will be observed that the elapsed time can be easily and quickly determined by the simple operation of turning knob, I', to operate dial, S, with member, E, and thereafter the calculation can be obtained, and in like manner, by pulling outward the knob, $l$, in order to rotate dial, R, and member, D, with respect to dial, S, such rotation of R and D being arrested automatically by dog, P, engaging with serrated plate, O, so as to indicate on dials, R, S, the calculation resulting from multiplying the elapsed time by the rate per hour.

The operations are simple, automatically determined by the machine, and readily performed by the average accountant at a material saving in time and labor.

It is evident that various changes may be made in the construction of the operating parts and in the minor features of the machine without departing from the spirit of the invention. For example, I may provide a gear pinion on the hub of member, E, instead of the crown gear, G; in lieu of reciprocating rack, J, for operating gear, D', and member, D, I may use a toothed segment operated by a swinging movement of a suitable hand piece; and, further, the operating devices for members, D, E, may be positioned at the respective sides of the machine so that said devices may be operated by the two hands of the operator, one device being operated by one hand and the other device by the other hand. Furthermore, the character or form of serrated or toothed member, $o$, may be modified and changed to suit the requirements, and the form or construction of the stop device coöperating with member, $o$, can be changed to a swinging arm with a stud instead of a sliding stop on the rack, J.

Having thus fully described the invention, what I claim as new, and desire to secure by Letters Patent is:

1. In a calculating instrument, means for determining elapsed time, means for indicating said elapsed time, and a logarithmic scale coöperating with said means for calculating the amounts of wages for such elapsed time at variable rates per hour.

2. In a calculating instrument, means for indicating variable periods of time, and a logarithmic scale coöperating with said indicating means for calculating the amounts of wages for such variable periods at variable rates per hour.

3. In a calculating instrument, a plurality of revoluble members provided with dials, separate operating devices whereby said members may be rotated independently of each other, and stop mechanism operated by one of said members and adapted to control or limit the rotation of the other member.

4. In a calculating instrument, a plurality of revoluble members provided with logarithmic scales, a separate clock dial, separate operating devices whereby said members may be rotated independently of each other, and stop mechanism operated by one of said members and adapted to control or limit the rotation of the other member.

5. In a calculating instrument, a clock dial, a plurality of revoluble dials, means for separately operating said revoluble dials, and stop mechanism whereby the rotation of one dial to a determined position is adapted to arrest the rotation of the other dial at a determined position.

6. In a calculating instrument, a clock dial, a rotatable member provided with a clock dial and a logarithmic scale, a second rotatable member having a logarithmic scale, means for operating the rotatable members, and stop mechanism whereby movement of the first named member to a determined position operates, when the second member is rotated, to arrest said second member in another determined position.

7. In a calculating instrument, a clock dial, a rotatable member provided with a clock dial and a logarithmic scale, a second rotatable member having a logarithmic scale, a rotary operating device for imparting rotary motion to said first named rotatable member, means for operating the second named rotatable member, and stop mechanism whereby the movement of the first named member to a determined position operates, when the second member is rotated, to arrest said second member in another determined position.

8. In a calculating instrument, a clock dial, a rotatable member provided with a clock dial and a logarithmic scale, a second rotatable member having a logarithmic scale, means for operating the first named rotatable member, a slidable operating device adapted to impart rotary motion to the second named rotatable member, and stop mechanism whereby the movement of the first named member to a determined position operates, when the second member is rotated, to arrest said second member in another determined position.

9. In a calculating instrument, a clock dial, a rotatable member provided with a clock dial and a logarithmic scale, a second rotatable member having a logarithmic scale, a serrated stop member movable with the first named rotatable member, operating devices for said rotatable members, and another stop member movable into engagement with said serrated stop member.

10. In a calculating instrument, a clock dial, a rotatable member provided with a clock dial and a logarithmic scale, a second rotatable member having a logarithmic scale, a serrated stop member movable with the first named rotatable member, operating devices for said rotatable members, and a sliding stop member movable with one of said operating devices and adapted to engage with the serrated stop member for arresting the rotation of the second named rotatable member.

11. In a calculating instrument, rotatable indicating members, devices for operating the same separately, a serrated stop member rotatable with one of said indicating members, and another stop member movable with one of said operating devices and adapted to engage with said serrated stop member.

12. In a calculatng instrument, rotatable indicating members, an operating device for one of said members, a serrated stop member rotatable with one of said indicating members, a second stop member adapted for engagement with the serrated stop member, and another operating device adapted to impart rotary motion to the other indicating member and to simultaneously actuate the second stop member until it is arrested by said serrated stop member.

13. In a calculating instrument, rotatable indicating members, an operating device for one of said members, a serrated stop member rotatable with one of said indicating members, a sliding operating device coöperating with the other of said indicating members for imparting rotary motion thereto, and a second stop member carried by said sliding operating device and adapted for coöperation with said serrated stop member.

14. In a calculating instrument, a plurality of dials positioned substantially in the same plane, rotatable members adapted to carry certain of said dials, separate operating devices for said rotatable members, and stop mechanism coöperating with said rotatable members.

15. In a calculating instrument, a rotatable indicating member having a scale, a rotatable operating device geared to said indicating member, another rotatable indicating member having a scale, a slidable operating device for said second named indicating member, and stop devices coöperating with said indicating members.

16. In a calculating instrument, a clock dial, an indicating member having a clock dial and a logarithmic scale, means for operating said indicating member, a second indicating member having a logarithmic scale, an operating device for said second named indicating member, and stop mechanism movable into position by one indicating member for arresting the other indicating member in a predetermined position.

17. In a calculating instrument, a clock dial, an indicating member having a clock dial and a logarithmic scale, means for operating said indicating member, a second indicating member having a logarithmic scale, a slidable rack geared to the second indicating member, means for retracting the rack and retaining the second indicating member normally in a certain position, means for operating the rack, and stop mechanism movable into position by the first indicating member for arresting the second indicating member in a position to indicate the calculation.

In testimony whereof I have signed my name to this specification in the presence of two subscribing witnesses.

CLARENCE A. BISHOP.

Witnesses:
H. I. BERNHARD,
M. C. POWELL.

Copies of this patent may be obtained for five cents each, by addressing the "Commissioner of Patents, Washington, D. C."